(12) United States Patent
Halpern

(10) Patent No.: US 6,173,897 B1
(45) Date of Patent: *Jan. 16, 2001

(54) UNIVERSAL CARD INTERFACE MODULE FOR CONTACT FREE CARDS

(76) Inventor: John W. Halpern, 15 Jordan Court, Ingram Crescent, West Hove BN3 5NU, East Sussex (GB)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/122,672

(22) Filed: Jul. 27, 1998

(51) Int. Cl.$^7$ .................................................. G06K 19/06
(52) U.S. Cl. ........................................ 235/488; 235/492
(58) Field of Search ..................................... 235/488, 486, 235/492, 380, 375, 382.5, 382; 340/825.31

(56) References Cited

U.S. PATENT DOCUMENTS

| | | | | |
|---|---|---|---|---|
| 4,795,898 | * | 1/1989 | Berstein et al. | 235/487 |
| 4,835,846 | * | 6/1989 | Juan et al. | 29/840 |
| 4,960,983 | * | 10/1990 | Inoue | 235/449 |
| 5,434,398 | * | 7/1995 | Goldberg | 235/380 |
| 5,436,441 | * | 7/1995 | Inoue | 235/487 |
| 5,444,222 | * | 8/1995 | Inoue | 235/380 |
| 5,587,574 | * | 12/1996 | Van Geel | 235/380 |
| 5,594,680 | * | 1/1997 | Ohtake et al. | 365/63 |
| 5,648,761 | * | 7/1997 | Kreft et al. | 340/825.31 |
| 5,670,772 | * | 9/1997 | Goto | 235/493 |
| 5,675,658 | * | 10/1997 | Brittain | 381/72 |
| 5,698,838 | * | 12/1997 | Yamaguchi | 235/492 |
| 5,821,525 | * | 10/1998 | Takebayashi | 235/492 |
| 5,852,289 | * | 12/1998 | Masahiko | 235/492 |

* cited by examiner

Primary Examiner—Thien M. Le
(74) Attorney, Agent, or Firm—Rothwell, Figg, Ernst & Manbeck

(57) ABSTRACT

Card and Card Reader contain a broadly m-shaped or twin looped antenna consisting of one or more thin conducting layers between plastic laminates wherein the middle branch 18 oscillates in anti-phase with the two outer branches 16 and 17 for proximity coupling applications, whereas all the said three branches oscillate in phase in distant read/write applications.

The prevailingly capacitive positions 15, 13, 14 of the antenna can be utilised for card readers where it is preferred to draw a card through a slot into the interior of a sensor unit where the card may be tested, processed, or if need be, withdrawn. Capacitive transfer may be also useful in cases where the temporary clipping of the card to a piece of equipment will unite its data base to a digital system. The instructive component can best be utilized in informal proximity presentations of the card to a Reader area; and its electromagnetic manifestation can best be used in card identifications a distance of several meters.

In order to avoid in proximity transactions a change of transfer efficiency due to subtle alterations in antenna attitudes relative to each other, or in the spacing from each other, or in other modifications of the environment affecting the radiation resistance of the antennas of the said units, this patent application also describes means for allowing the primary frequency of the oscillator source to fluctuate, and to be self-adapting to said random conditions.

13 Claims, 15 Drawing Sheets

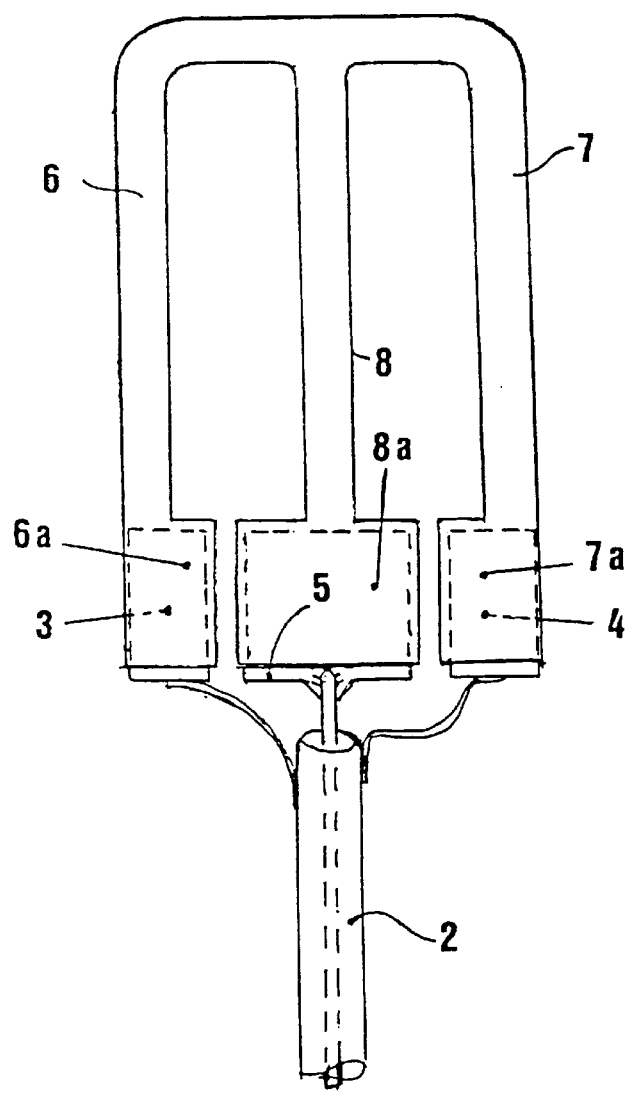
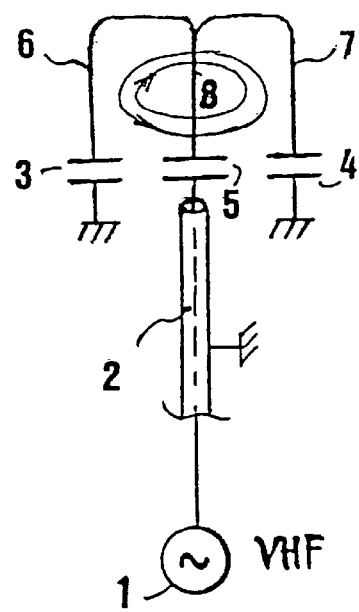
FIG 1
FIG 2

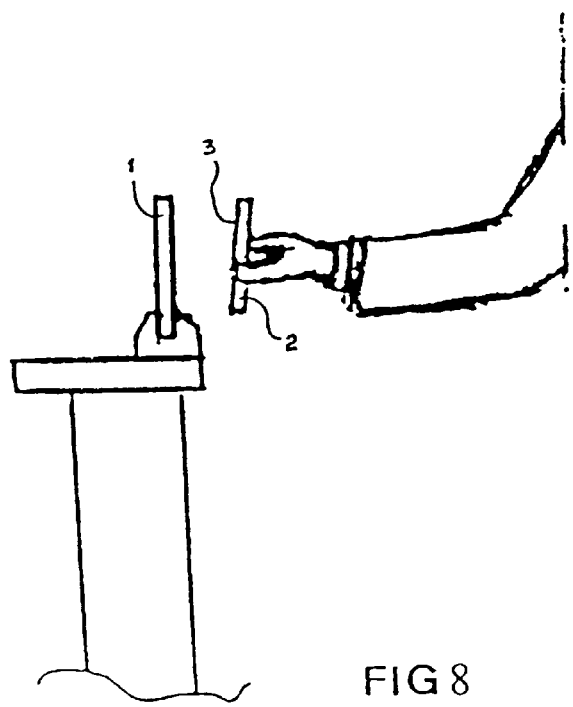
FIG 8
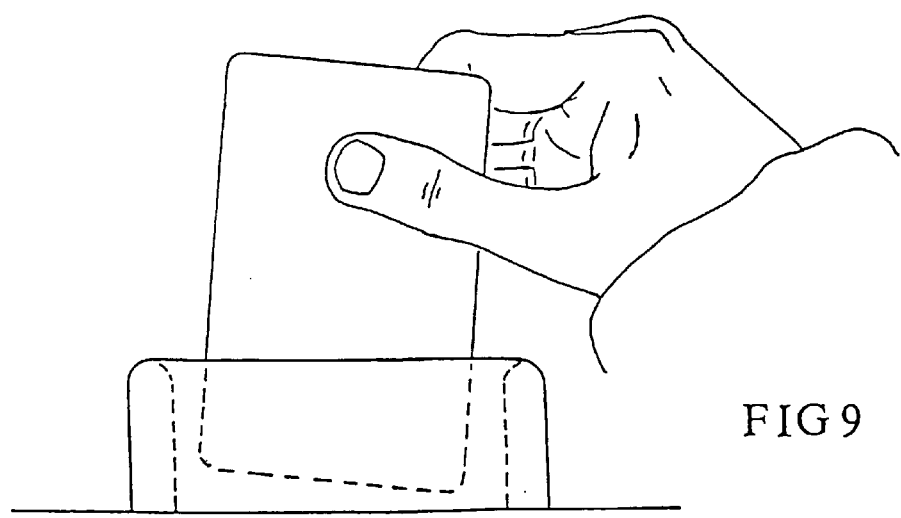
FIG 9
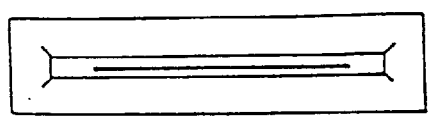

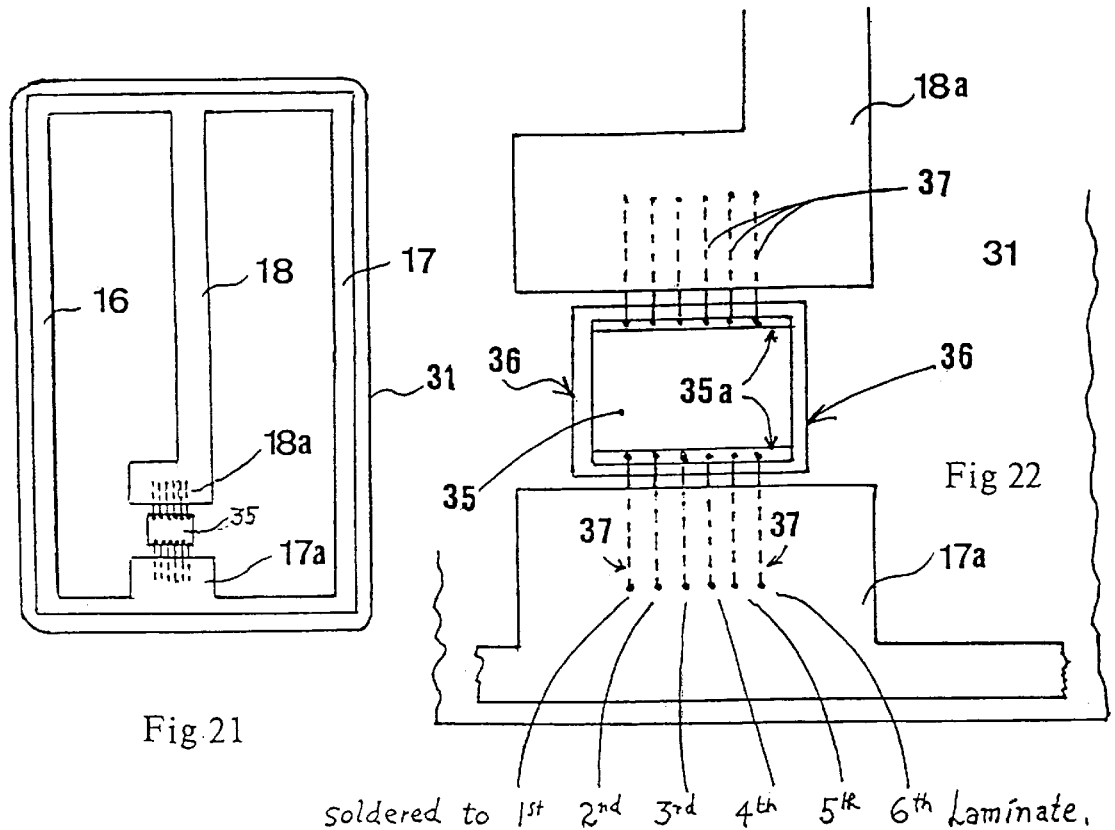
Fig 21
Fig 22
soldered to 1st 2nd 3rd 4th 5th 6th Laminate.
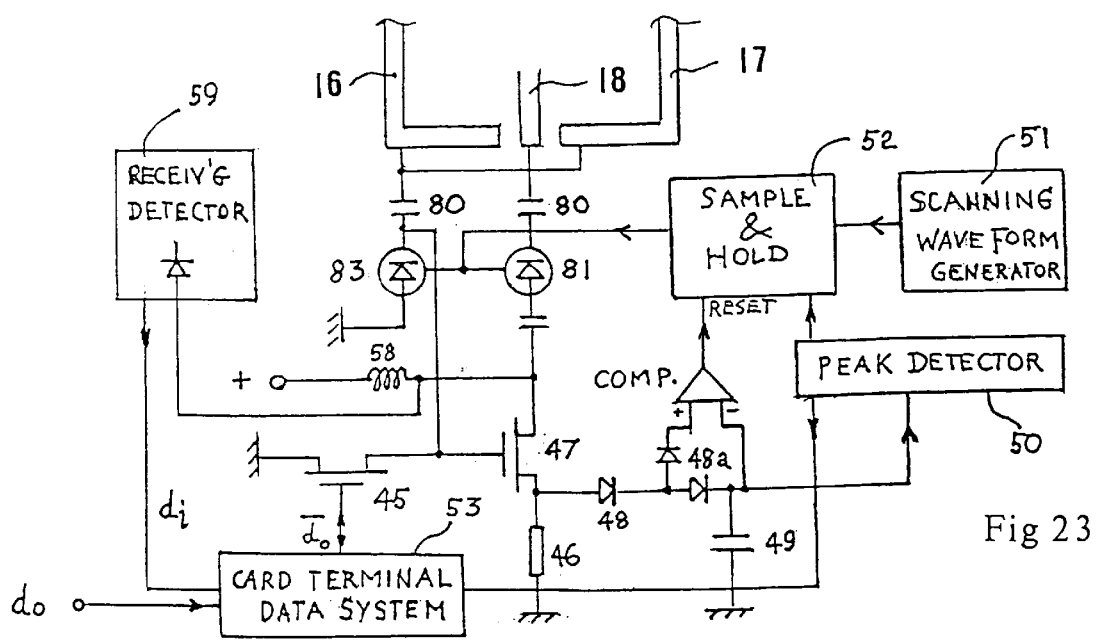
Fig 23

UNIVERSAL CARD INTERFACE MODULE FOR CONTACT FREE CARDS

In the field of personal cards containing a microprocessor, one distinguishes between contact cards wherein the terminal or Reader unit supplies electric power to the card chip by means of delicate contact feelers, and non-contact cards which receive the requisite electrical power by electromagnetic radiation or close proximity inductive transfer. The present paper relates to the latter type.

Also in this field, innovative efforts arose quite early, an example being the British patent GB 1,314,021 (Digital data carrying component and associable data transfer device) wherein it was intended to replace magnetic stripe cards by inductively-coupled card components in automatic fare assessment and collection installations, on railways and buses. Meanwhile, the demand for stored value cards evolved in many other fields as well. One can divide them into three groups, namely (a) those cards which are required to be read, and written on, inside a machine so that the card, if invalid for one reason or another, can be retained. In such cases, the card is inserted through a slot and then drawn mechanically to the transaction location.

(b) cards required in situations where the emphasis is on user convenience and transaction speed; the card remains hand-held and passes the Reader at fairly close proximity (15–150 mm).

(c) cards which are in visual line with a Reader position at a distance of 1–10 metres, and are required to deliver a signal identifying the card holder to the interrogating station.

At present, no cards are available that could perform well in all of the named cases. While it is feasible for persons to carry several stored value cards, in practice this is an inconvenience and creates confusing accounting problems. It would be desirable to have to handle only one type of card for the various application cases. This would also avoid the need to install different update equipment for each card group.

There are, however, considerable obstacles to the producing of a single type of card capable of satisfying the above listed operation modes.

The aim of the present invention is to point out the principles for a non-contact energy and data transfer system which permits the card to be read at very close distance, at a medium range of proximity (say, 20 mm to 150 mm), as well as at a distance of several metres; using a card which can be manufactured at a low cost, will not age through frequent usage, will not deteriorate over time and will not generate electronic pollution through radiation.

It is not irrelevant from the economic point of view whether or not these apparently high-staged objectives are achieved or not. If they were shown to be non-achievable, this would mean a very large increase in the production of plastic cards and card Readers of different types. In terms of total cost, this may well exceed the total cost to the economy of minting coins and printing currency notes. This would contrast with the declared purpose of modem cards to reduce the overheads of value exchanges and trade.

In my preceding patent applications nr. 9605050.4 and 9606764.0 I have set out the design principles of an antenna module built into the card which would permit the use of a single card for the card groups (a) and (b) referred to in the introduction.

To this will now be added a demonstration of suitability of essentially the same antenna module also for card communication with a distant Reader Station. The description that follows is largely a repetition of the material already deposited (as quoted) although there are minor amendments and insertions. This is followed by a new chapter which explains how the card would perform responsive to a gigahertz electromagnetic communication channel.

For most financial transactions it would not be desirable for a Reader Emitter to power up a card at a distance of more than 3–4 inches. It would, on the other hand, be desirable that on bringing a card closer to the Reader Plate, there should be a steep rise in the injected power level, reaching its peak at about 2 inches distance. Upon approaching the Card Reader still further the power level should remain constant, or at least, nearly constant.

It is feasible to design a coupling system so that this is achieved, based on the provision that the Antenna is connected to an oscillator whose frequency is lower than the resonance frequency of the Reader Antenna. As the card antenna comes closer to the Reader Plate, the mutual inductance of the antenna pair increases, in such a manner that the joint resonance frequency coincides with the preset frequency of the Reader driving oscillator. This may be set to be the case at a distance of, say, two inches. If the user brings the card still closer to the Reader unit (beyond the critical coupling) the energy transfer would tend to become less efficient; however, the flux interlinkage would increase still further.

In balance, adequate power will be transferred to the Card between zero to 2½ inches proximity. In the absence of a card in its environment the Reader Antenna 'falls asleep', there will be but low radiation from the Reader. This would be further reduced because of a degree of mutual cancellation of the twin coils of the Reader Antenna at non-proximity distances. The FIG. 5 of GB 2291725 indicates the basic circuitry in the card when receiving input from the Reader twin radiator elements which operate in antiphase.

In FIG. 5 of the named patent, (reproduced on FIG. 7 in this paper) the coupling elements are two capacitor pairs 180° out of phase; even the voltage parameters which characterise individual data its occur in the coupling pairs in opposite directions relative to a steady state condition. Their separate interface sections (32,33) produce therefrom a single input signal to a circuit group (34) which translates the signal into a high or low data bit, and into a clock pulse, both inputted to a microprocessor (30).

Whereas thus in close proximity (say, between 1 mm to 60 mm), the antiphased signals can be read out separately and become additively effective within the card antenna and connected circuits, at a spacing beyond 100 mm the two signal elements intermingle and cancel each other. (The behaviour at VHF frequencies will, however, have to be established experimentally.)

In the present paper, the capacitor plates are widened portions of the coil elements. It is envisaged that a coil is made of thin conductor stripes deposited on thin laminate insulating material of which the card is to be made up. The purpose of this arrangement is to avoid the strain on the coil material if it were constituted of solid wires or relatively thick metal deposits. It is reported that coils of the latter kind when subject to frequent bending, become brittle and develop discontinuities which understandably ruin the resonance effect.

By making the width of the inductive strips fairly wide, its thickness can be made small enough to avoid any undue strain during the bending of the card. It is no longer possible to accommodate several turns; however as will be seen it is possible to have a number of loops co-acting in parallel.

DESCRIPTIONS OF A FEASIBLE MODE

The antenna for the Card Reader would consist of two inverted U conductors wherein the two middle legs are combined into one (8, see the equivalent circuit of FIG. 1), the two outer ones being 6 and 7. 3,4 are capacitive loads; 5 is a coupling capacitor connected to a conductor 2, driven by an a.c. generator 1.

The Reader antenna configuration (FIG. 2) is almost a replica of its electrical equivalent circuit of FIG. 1. FIG. 2 shows the electrical deposits on the plastic substrate of the Reader Plate. The strip conductors of the coils (6,8,7) are widened at the bottom (6a,8a,7a) to form capacitive areas conjointly with the grounded strip patches 3 and 4. The patch 5 is connected to a coaxial link 2 leading to a VHF drive unit (not shown).

As explained in the introduction, the VHF drive unit will operate at a frequency which is below the resonance point of the described antenna configuration. Therefore, the capacitive impedance will prevail and the current flow in the antenna will be small.

FIGS. 3 and 4 show the equivalent and real conductors for the card component. They are self-explanatory. In FIG. 3, the item 20 is a load element, usually a microprocessor and/or memory chip.

When a card antenna such as shown in FIG. 4 approaches a Reader as shown in FIG. 2, the mutual inductance of the two coil pairs is added to the one which each has for itself. When they are spaced by two inches the added mutual inductance will be sufficient to lower the joint response frequency to the same level as the VHF applied to the Reader unit.

At very close proximity, say when the card is inserted into a slot, the intensity of the flux linkage will be so great that in spite of the too tight coupling factor, the energy transfer will be sufficient to operate the card processor chip 20, even though the card is not inserted over its full length.

Greater stability in the transfer conditions can in certain cases be obtained when the useful load 20 is not connected in parallel to capacitor 15. Serial connection of the load is shown in FIG. 3A.

It is feasible that the power transfer conditions would be improved if, instead of only one laminate in the card, several identical laminates and strip antennas exist in parallel. The connecting point between the load and the several antenna strips 18 may be produced by a soldered through-going rivet. FIG. 5 shows a preferred version using 4 laminated substrates, $l_1$, $l_2$, $l_1$, $l_2$. These have conductive deposits (except $l_1$) in the shape of the m-shaped antenna with the capacitive end portions 13, 14 and 15 (FIG.4).

FIG. 5 shows a cross section through the capacitor position, the card thickness d' is enlarged in the d-dimension. The centre conductor 19 serves as a neutral electrode and can be used in place of a ground terminal.

This illustration (of FIG. 5) also shows something important: the feasibility of using the card in a shallow capacitive card reader unit (such as shown in FIG. 9). The metal layers 21 and 22 are part of a capacitive energy and data transfer arrangement similar to that shown in FIG. 7 except that the proposed module requires one of the two electrodes (say 4α) to be split into two halves (13/13 and 14/4) whereas the other one (4β) is represented by electrode 15/15.

FIG. 6 shows the equivalent circuit for the double laminate antenna module. The reference numbers are the same as used in the cross section of FIG. 5, the functional correlation is therefore easily established.

Item 24 is a generator of VHF sin waves such as may be produced, for example, by the carrier of a mobile telephone set. The purpose of the card in this context would be the possibility (described in GB 2,291,724 B) of connecting the card to a remote bank computer—if the PIN on the keyboard has been entered correctly - to update the card from the holder's own bank or credit account [value re-load]. Mobile card update devices could be built, with or without also offering an audio communication link.

In FIG. 6, item 23 is a modulator unit controlled by the data input derived from a computer or card processor unit.

From the description, it is clear that this invention relates to a card read/write system which combines the capability of a card readable at very close proximity to the R/W transfer elements with the capability of R/W transfer over a distance of up to 100 mm.

In practice, both are expected to be needed in different usage situations, and it is a matter of economy and personal convenience that there is now the possibility of a card becoming available which is equally functional in both cases.

The question shall now be pursued, how would the conductive pattern of FIG. 4 behave if the magnetic field changes that passed through the left half and those that pass through the right half were not—as so far described –180° out of phase, but in phase? It is believed that there will be also a resonance point, or even several such, yet at considerably higher periodicities. The three inductive elements (16, 17 and 18, FIG. 10) would oscillate at frequencies which are close to each other if not at exactly the same frequencies. By appropriate adjustment of the L-C factors uniform tuning should be achievable. Meanwhile, these questions are answered by reference to graphs as shown in FIGS. 15 to 20 inclusive.

Also it may be possible to excite an oscillation in a card antenna by sending a beam of fast rising pulses from the antenna of a monitoring point towards a card some distance away. The monitoring point would receive the radiation reflected by the card, detect any modulation, and register the digital data contained therein.

The presence of a card when crossing the monitoring beam is detected simply by the occurrence of the selectively received card scatter frequency. A binary "1" is detected by an occurrence of a sudden depression in or disappearance of the received signal. The modulation of the reflected radiation is produced in the card antenna (FIG. 10), by the sequential digital output produced in the card chip L. The output data $d_o$ (FIG. 13) are applied to the gates of two field effect transistors, as shown. A logic high voltage level makes the transistor conductive thereby loading or short circuiting any differential voltage between points a and c, or respectively between b and c.

As can be seen from FIG. 10, thin wires connect the chip L with correspondingly marked points in the antenna structure.

When the card antenna is excited by a distant radiation source, the card antenna-points a and c develop node points of different electrostatic potential.

On the other hand, when the card is read in close proximity, differences of potential will occur mainly between c and b. With the occurrence of a binary "1" when scanned by a proximity monitoring point, the amplitude modulation of the induced card radiation will therefore be deeper.

The points a,b,c are also indicated in the electrical equivalent circuit of FIG. 11. Incidentally, the elements marked with the index 25 are intended to indicate the occurrence of capacitive magnitudes in the conductors by an increase of their width, making them behave differently from a simple wire connection. The connection between L and b is shown by an interrupted line in FIG. 11 to signify that the b-connection to the chip has no relevance in the case of long-distance card scanning.

It is also possible to enter data into the card by a short-or long-distance source. This is indicated by FIG. 12. As the node points, a or b acquires a potential difference against point c, the dc output across the terminals d and e becomes larger than zero provided diodes 26 with a low forward voltage drop are employed. These rapidly pulsed d c voltages can be used in a voltage multiplier section of the chip L for providing an operating power, as well as for detecting data in them.

Two-way communication between card and a monitoring post should be readily realisable where a spatially well-defined beam working over relatively short distances is involved.

The inventive importance of the m-shaped or twin-looped card antenna is that it can be electro-magnetically coupled to a similar antenna in the Reader Unit, the radiation of which is so constituted that it can have an effect only at short distances. Beyond a distance of about 4 inches perpendicular to the centre axis of the antenna, hardly any radiation is expected to be seen. And even sideways, the radiation vectors would be abnormally reduced. It is therefore the sort of Card Station which will not disturb neighbouring equipment or communication channels.

Another aspect of the described card antenna's versatility is that it can be purely capacitively coupled in very close proximity to other equipment. It would only be needed to clip the card to a surface of another piece of equipment where the plates 3, 5 and 4 (FIG. 2) are mounted in congruence with similar plates in the card. Not only can simple shallow-height Readers be made such as shown in FIGS. 5, 6 and 9. A card might be clipped to the rear of a mobile telephone or inserted into a shallow slot therein, enabling it to transfer purchase power to another subscriber, or to connect to the card owner's bank account in order to request a card update, a display of a status report, or any other detail of his or her portfolio.

The mobile phone keyboard would in this connection be used for entering the secret PIN into the card, for comparison with a pre-recorded PIN held in the card. Only if the comparison is successful will the card's own data be accessible to the outside world.

Apart from providing facilities on a mobile phone for integrating a (clipped-on or inserted) stored value card of the described type with the data transmission/reception capability of said mobile phone, it is also possible to build self contained financial mobile communication devices which can be coupled to a card according to the present invention by close proximity, and which have a keyboard, a display window and a VHF antenna, the former for calling forth any desired data from the card memory, and to display them; the latter, for selective calling up one of the computer stations for updating one of the card accounts, in accordance with agreed protocols.(see FIG. 8).

There are also useful practical application forms for the medium-range proximity (10 to 100 mm) version of the card. In automatic fare collection, the normal use of the card would be that it is and remains handheld during the duration of the transaction cycles. This is no problem since the duration is in most cases measured in milliseconds.

However, with the rising tide of tourism, many travellers carry also luggage; housewives carry shopping bags—sometimes two or three. Taking out a card and retrieving it from a wallet takes time, meanwhile, other passengers have to wait behind the tourist.

Some suppliers of contactless cards offer a solution in that the traveller may keep the card in the wallet, which may even be left in the person's coat or shirt pocket. This is based on the Reader antenna's radiation having a much larger working radius. While this may be satisfactory in most cases, the danger of involuntary transaction exists (for example, where there are several rows of turnstiles, one of the persons passing through may carry a sheet of metal or a tool box. Reflection therefrom may reinforce the level of a freak reception by the wrong card; the person affected may have to pay a major fare or find the card invalidated by reason of an incomplete response to a protocol.

It is therefore held that involuntary transactions should be avoided as a matter of principle; a deliberate action on the part of the traveller should always be required. That means that the card must be brought into the relatively close range within which a transaction can take place, and beyond which there is no radiation at all.

This can be achieved with the antenna module according to this invention, but it remains undesirable for housewives or tourists to search for a card as mentioned above. It would be possible, however, to provide shopping bags 40 with a small internal pocket (see FIG. 14) into which the fare card can be placed. Outwardly, the exact location of the farecard may be marked. By lifting the shopping bag and touching the Reader area therewith, the required transaction at an entry or exit turnstile would be performed, the turnstile unlocks and the passenger moves on.

A similar situation can be produced for the tourist carrying a heavy suitcase, 43 (FIG. 14, lower figure). By standardising the height at which the read/write elements are built into the turnstile, it is possible to attach a pocket, 42, inside the suitcase wall in such a manner that, by rolling the suitcase through the turnstile, the optimum interface between Card and Reader is established. Again, all delay is avoided.

The FIGS. 15–16, 17–18, 19–20 represent an extract from about 100 graphs, relating to performance patterns for copied (single and dual loop) FIG. 15 shows the change of energy transfer which increasing separation of the sending and receiving dual loop antennas contrasted with similarly sized single loop antennas in FIG. 16. As can be seen from these graphic presentations the power coupling from a pair of dual loop antennas drops from near 100% at 1 inch spacing to about 0.5% at 5 inch spacing, whereas a pair of coupled single loop antennas drops from 100% at 1 inch spacing to only 25% at one inch spacing. Not until the single loop antennas are about 4 foot apart is the residual power transfer equal to that of twin loop antennas at 5 inch spacing.

FIGS. 17 and 18 explore the difference for antennas which are displaced sideways along the x-axis, (for different spacing in inches) and FIGS. 19 and 20 explore similar shifts up or down along the y-axis. Comparisons between twin and single loop antennas are even more instructive.

For ensuring that only well defined and deliberate transactions occur between card and terminal, the twin loop antenna system has proven its superiority. By the same token, higher emission energies can be applied without breaching the limits for emission into space, thus improving transaction reliability within the assigned transaction region.

Whereas the means described so far have in tests proven to be very effective in achieving the declared objectives, there remained a preponderant uncertainty as to whether optimum transfer conditions can be reliably repeated even with the best of precautions.

At this point it was important to realize that it was quite irrelevant for the transfer of energy and even less so for the transfer of data, at which precise carrier frequency it is taking place. Therefore, the idea of employing a rigidly fixed carrier frequency could be abandoned. Instead, the VHF generator may be allowed at any moment to adjust its frequency to that one at which (as a result of all the contributive factors present) free oscillations can happen; this would make it more likely that also the coupled antennas are reasonably matched irrespective of the distance between the sending and receiving antennas (i.e. within the reduced range geometry due to the said M-shaped or twin-looped antenna elements as herein described).

In the drawings which give specific examples of execution, FIG. 24 shows an electric circuit closely connected to a VHF antenna. A coaxial feed line is deliberately avoided as its inherent impedance (or reactance, as the case may be) would reduce the adaptability of the circuit. FIG. 25 shows an example of encoding a digital signal to modulate the VHF power output of the circuit of FIG. 24.

FIG. 26 illustrates with considerable exaggeration the kind of frequency variation that might occur when the card antenna is gradually brought near the reader antenna. The aim is to get reasonably constant power between zero and four inches antenna spacing while beyond that a rapid reduction of power transfer would take place. This may be further emphasized by the provision of a negative feedback selectively reducing the amplifier effect at higher frequencies.—The figures in brackets indicate expected minimum variations obtainable from the self-adaptation of the carrier frequency to mutual inductance conditions.

DETAIL DISCUSSION OF THE DRAWINGS

Figure 16:
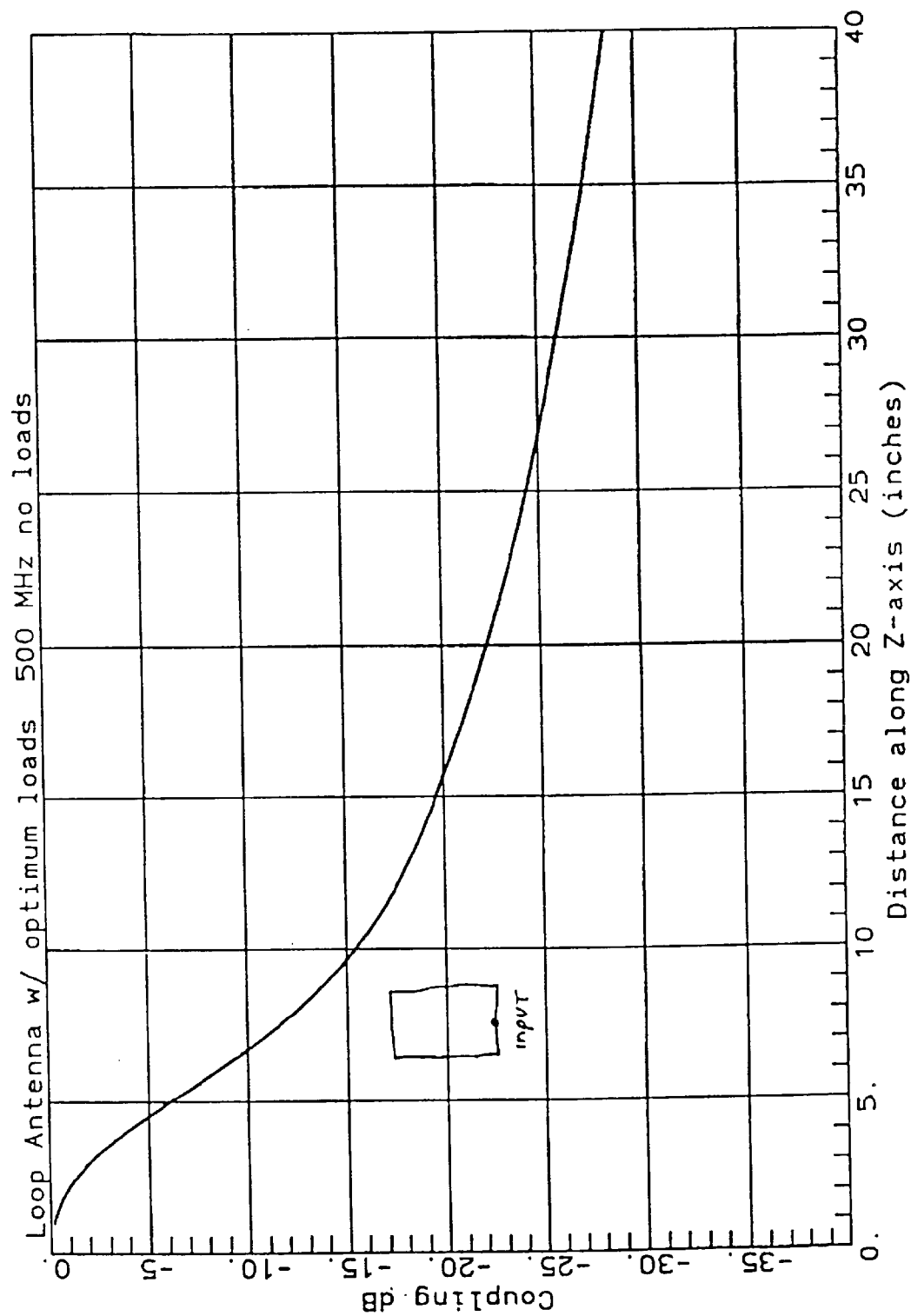
Figure 17:
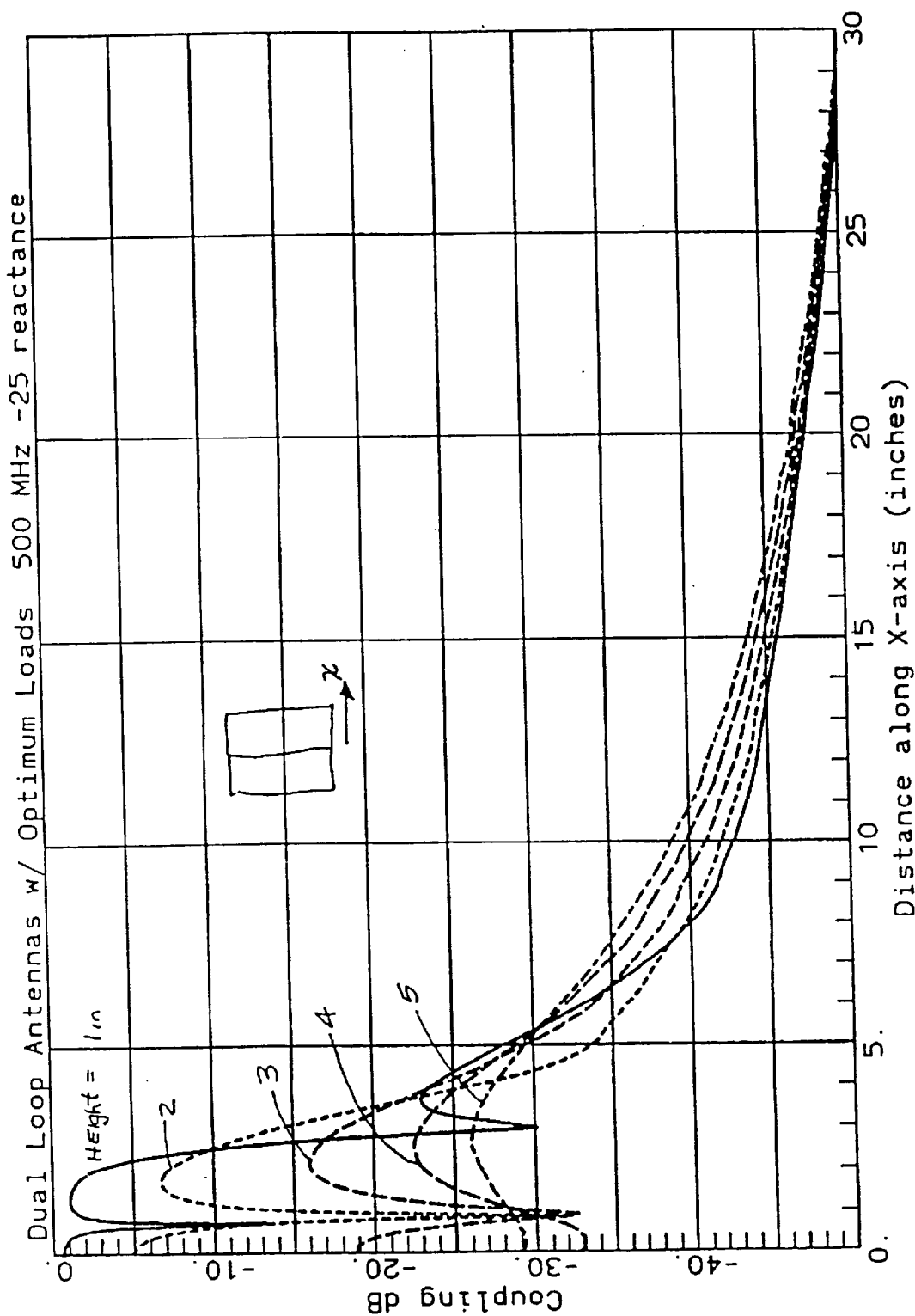
Figure 18:
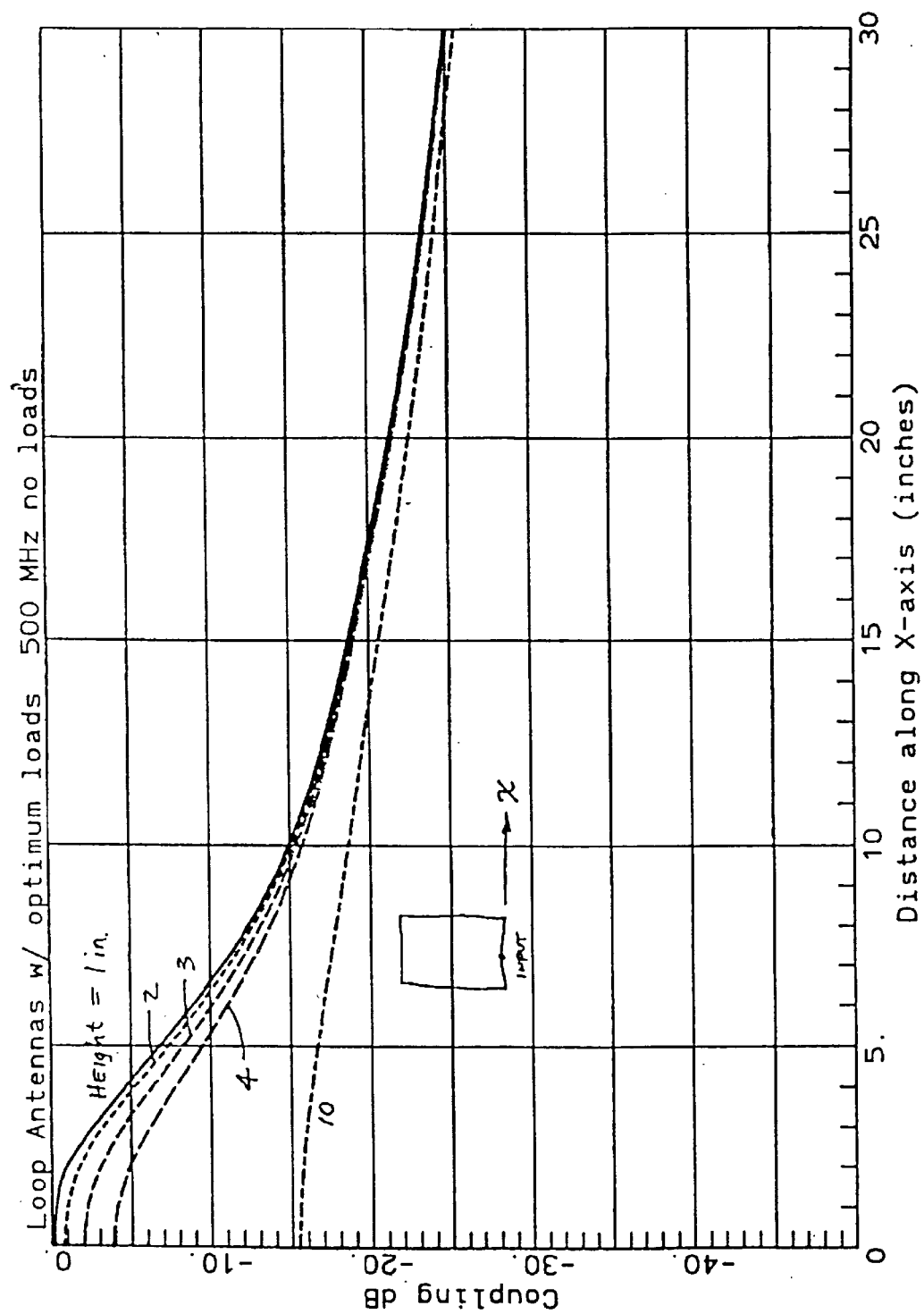
Figure 19:
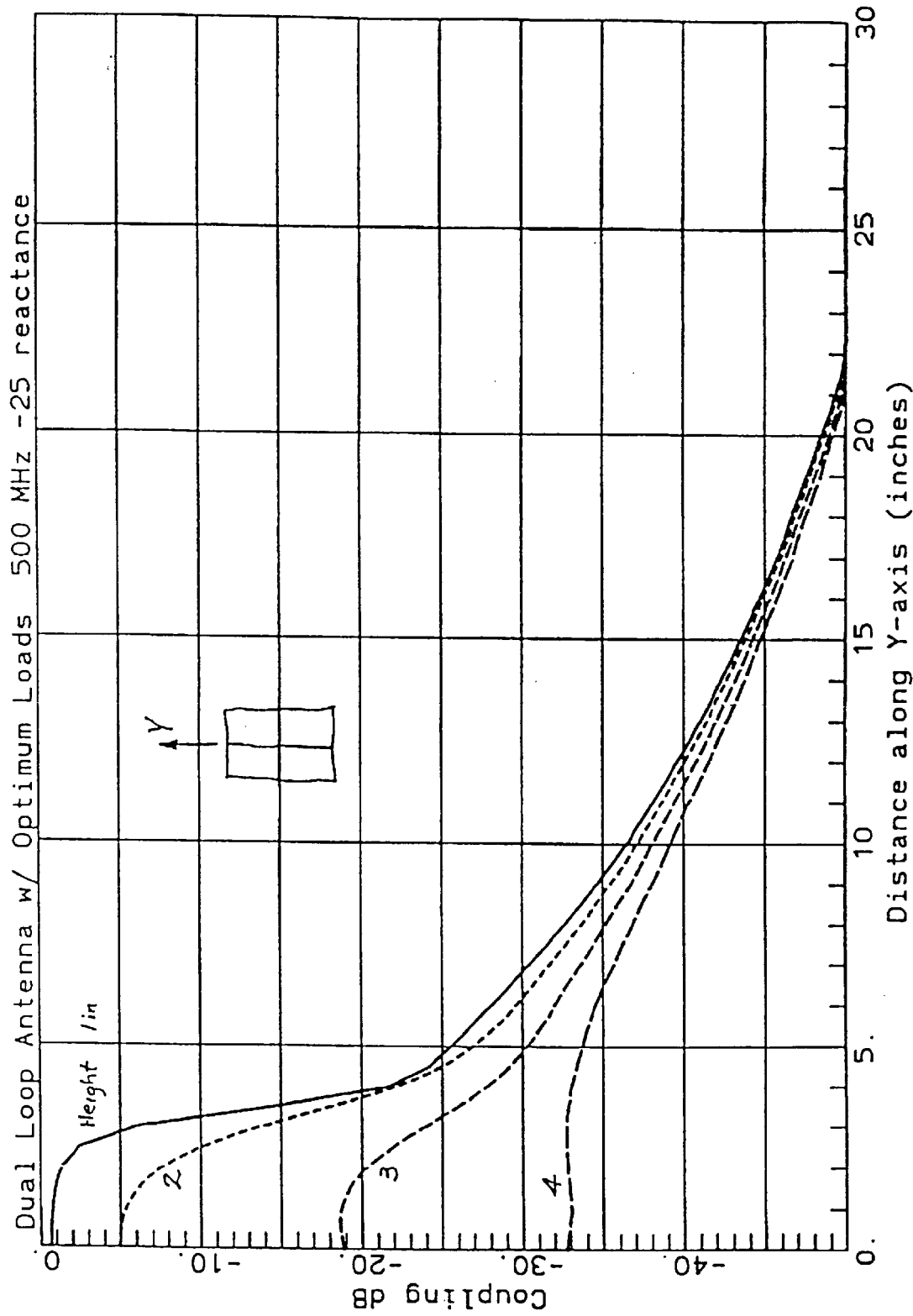
Figure 20:
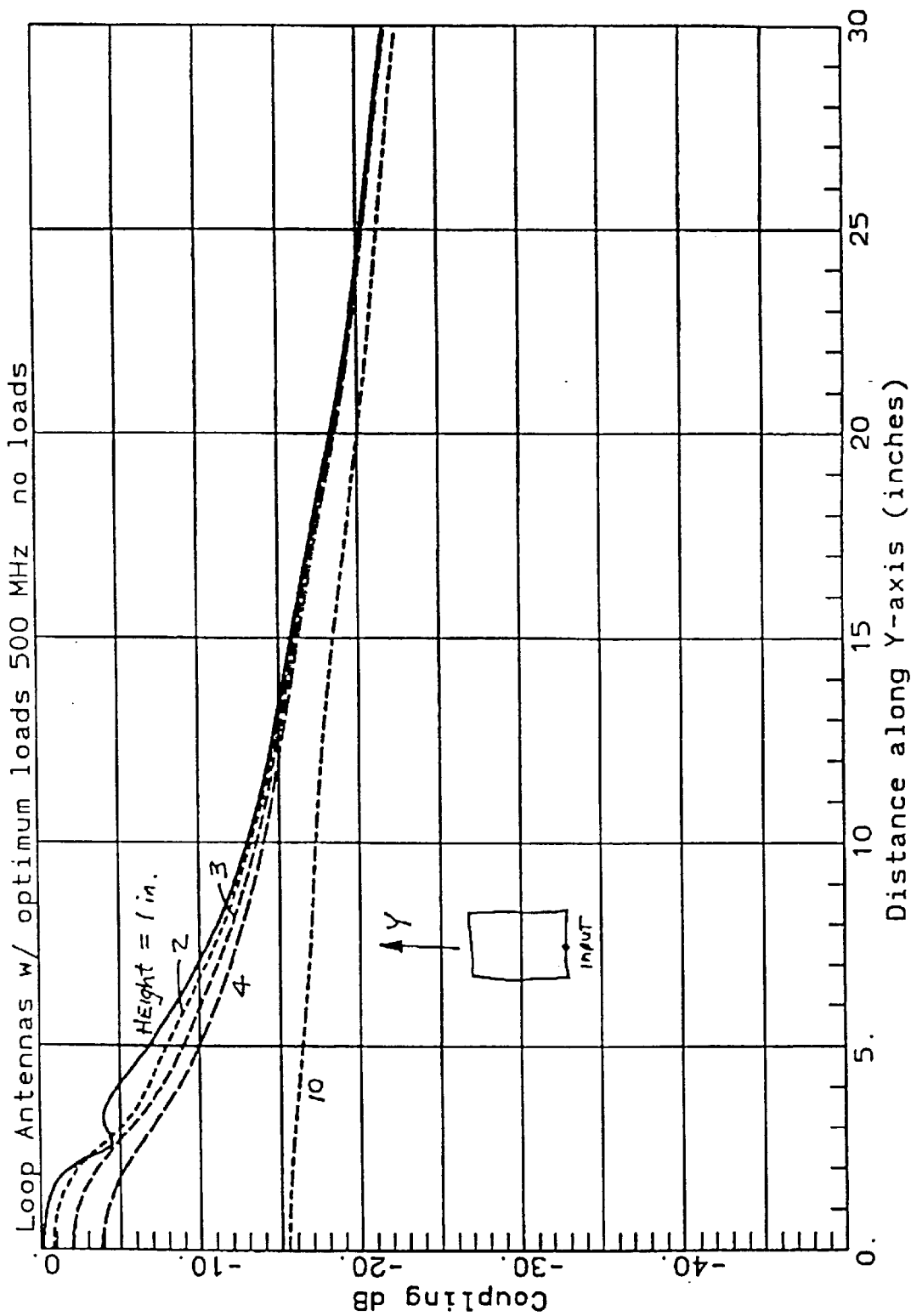
Figure 24:
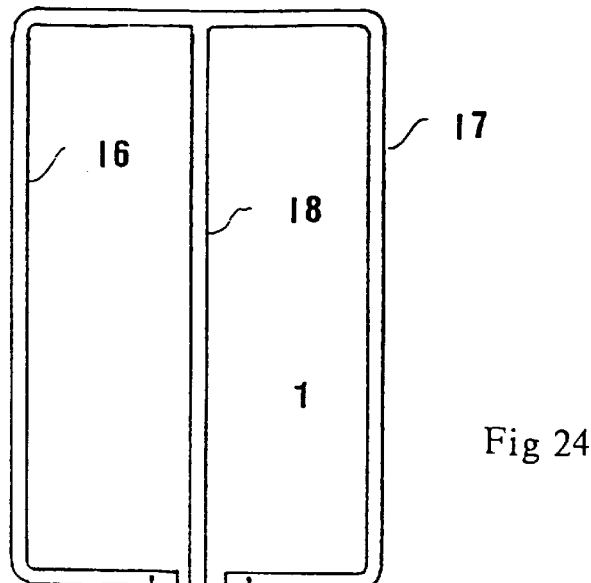

FIG. 24 shows a high-speed NPN transistor 47 which, over the shortest possible path, is connected to the twin-looped antenna with its centre branch 18 and its two side branches 16 & 17. In this example, this is done via coupling capacitors 66; the centre branch 18 is connected to the collector and the two outer branches via voltage divider 61/62 to the base of the transistor 47. When power is switched on, a pulse applied to branch 18 travels via the two outer branches reaching the base of the transistor, after a certain delay period. This causes an increase in transistor current and a voltage drop at the collector, thereby producing a negative going pulse applied to the centre branch 18 the condition for a build-up of an oscillation is given, and this would continue until radiation and other losses equal the power introduced.

Where the card loads is serially collected, frequency tuning is less important than impedance matching. The maximum of energy can be transferred if the inner resistance qualities of two coupled systems are approximately equal. An attempt at automatic matching is made a means of a proposed circuit schematically given in FIG. 23. Therein the index FIGS. 16, 17 and 18 refer to the lower portions of the dual loop antenna. These are connected via low reactance capacitors 80 to variable capacitors diodes 81 and 83, to which a sweep voltage is applied. The same is generated in a scanning wave form generator 51. As a result the reactance to ground is continually altered, in proportion to the scanning voltage applied, thereby providing the variable source resistance for the VHF or microwave antenna. When the matching conditions are optimal the currant flowing through the negative feedback resistance 46 will at some point reach a peak and then tend to diminish again. This is detected by the so called peak detector 50 which sends a 'hold' command pulse to the sample at hold circuit group. The reactants of the capacitors 80 and 83 becomes stable. The peak detector may then also give the star signal to the card terminal data system 53 to begin the required protocol sequence of data transfers which will then be carried out at a very high bit rate.

Another factor in the non contact power transfer is the number of turns that interact with the electro magnetic flux of the terminal it is quite visible to build a card wherein the serial load (the chip ic) is driven by several antennas in parallel.

Figure 3A:
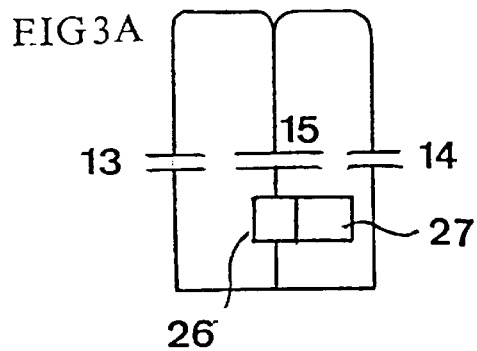
Figure 3:
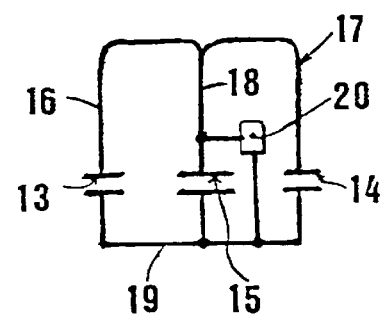
Figure 4:
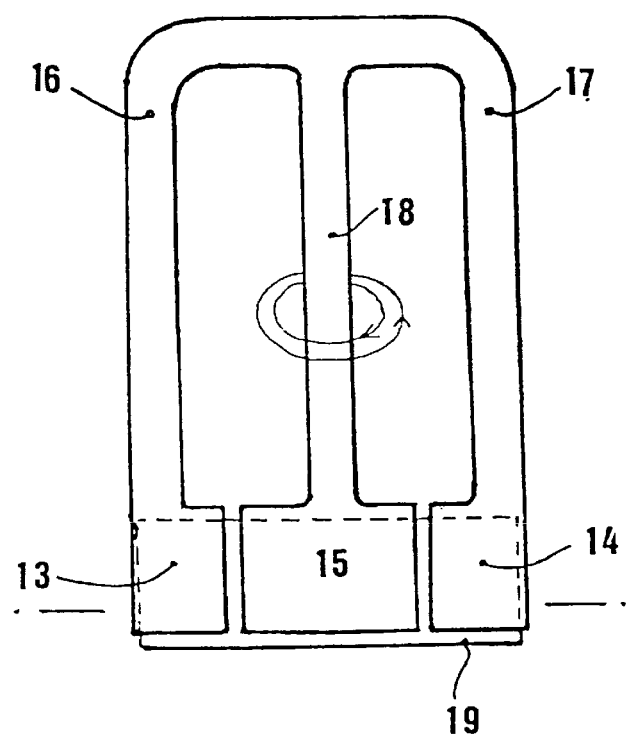
Figure 5:
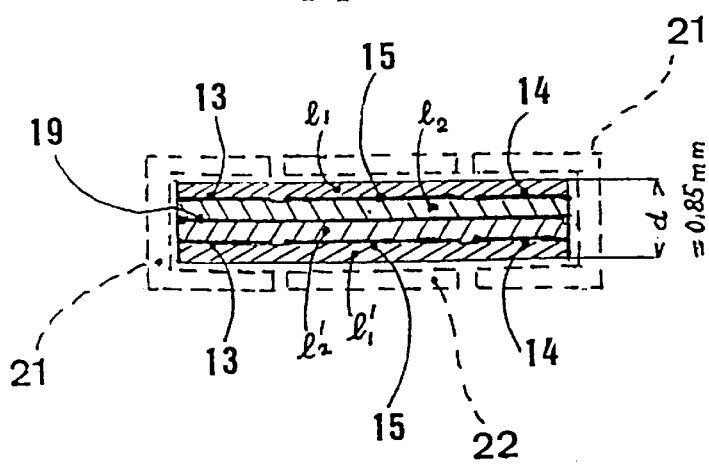
Figure 6:
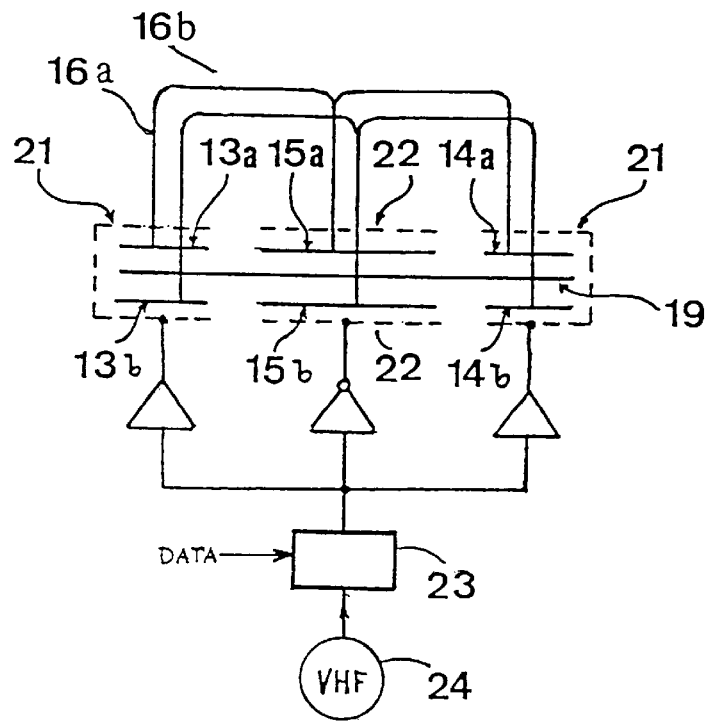
Figure 7:
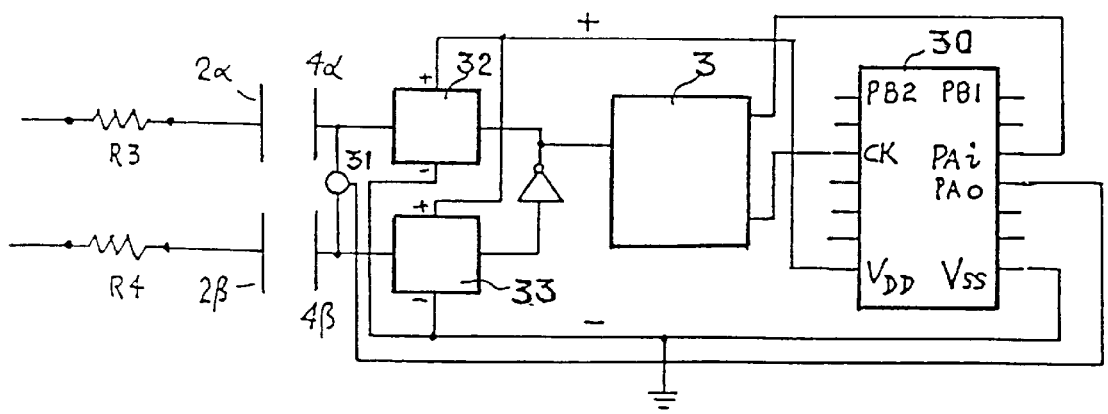
Figure 10:
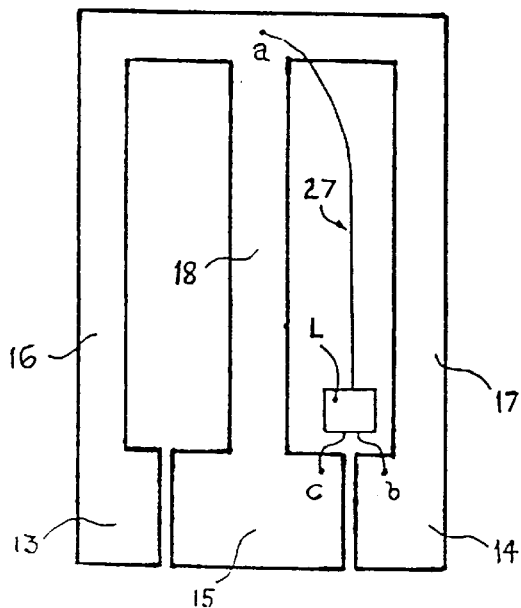
Figure 14:
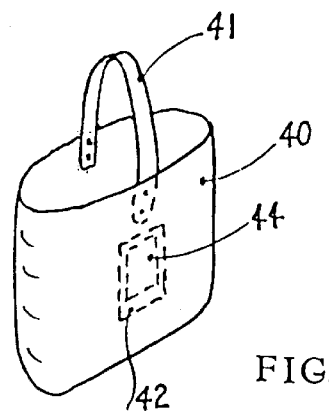
Figure 11:
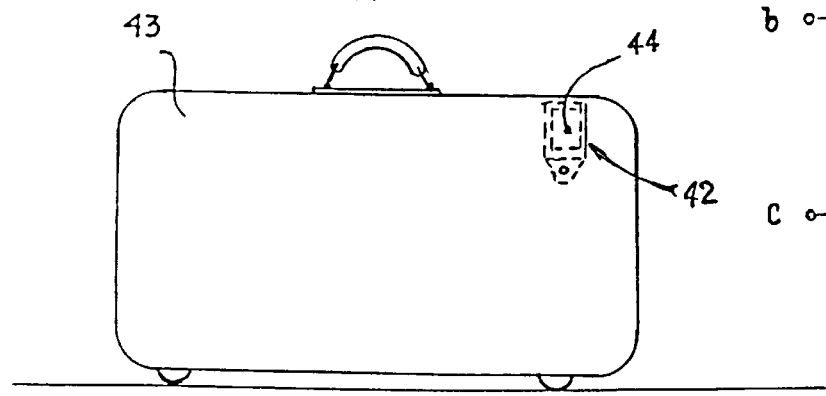
Figure 11:
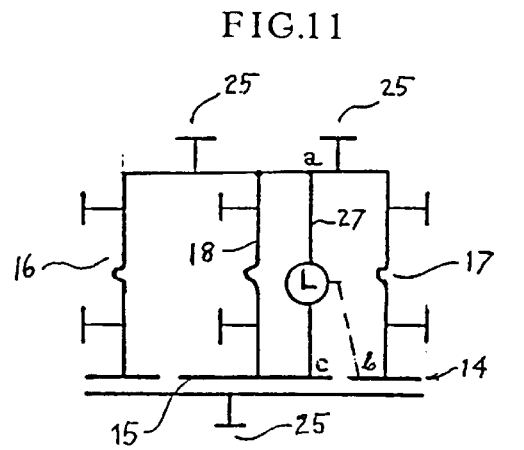
Figure 12:
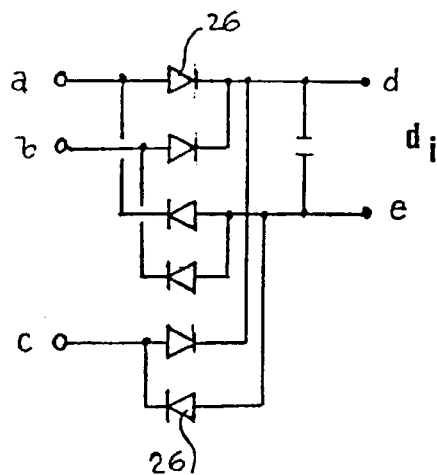
Figure 13:
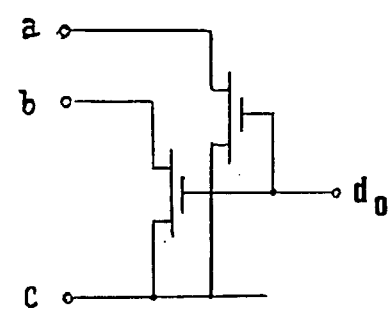
Figure 15:
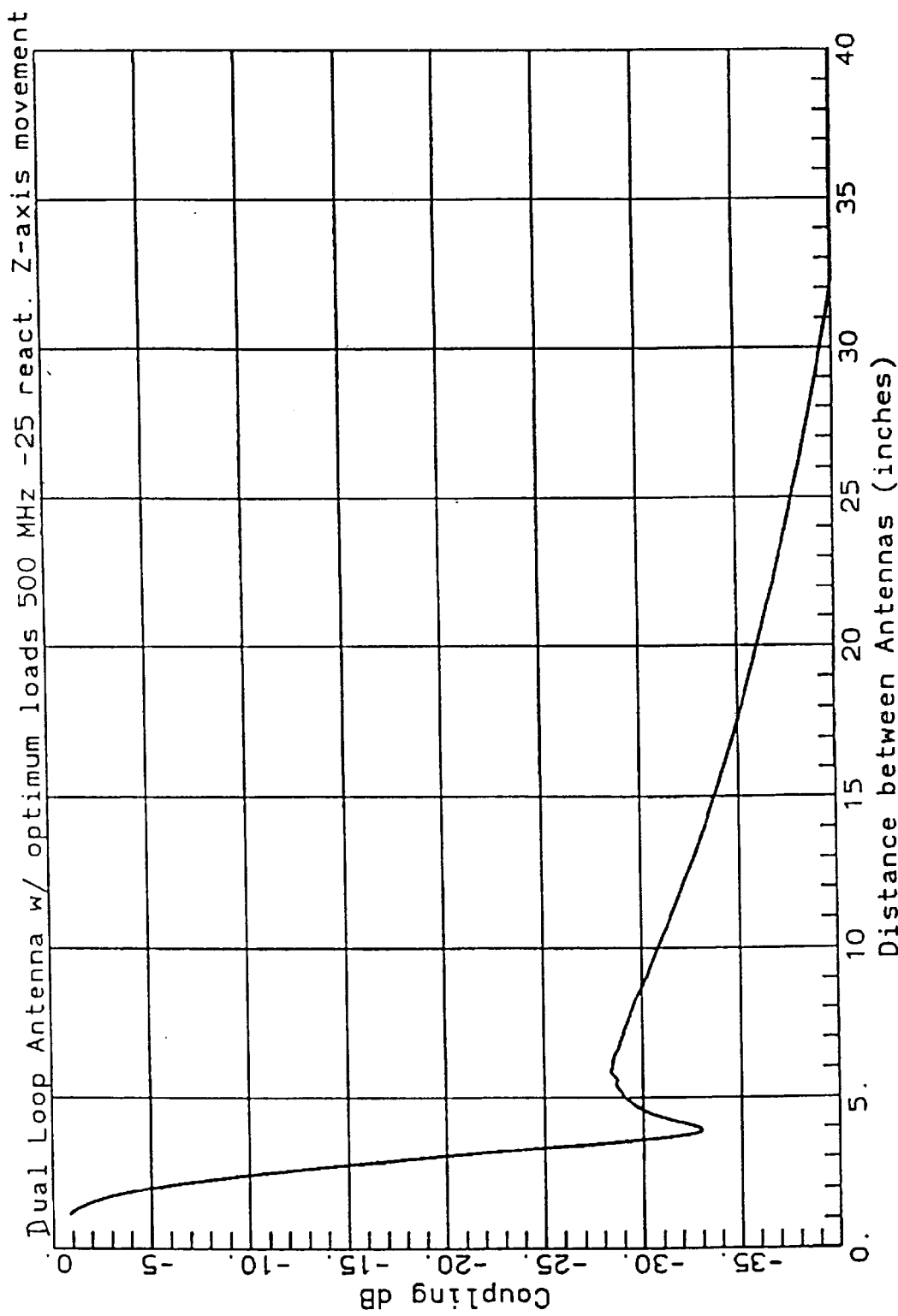

The antenna configuration of FIGS. 21, 22 is basically the same as that shown in FIG. 3a, which illustrates the chip i.c. load in series with the card antenna currents it is placed into the central branch 18 which widens to comprise a capacitively acting portion 18a; the two auto branches 16, 17 similarly widen into a portion 16a. This card as shown is made up of 6 laminated sections compacted to a total thickness of 0.6 mm, which makes each laminate only 0.1 mm thick. In each section a current of about 1 m A RMS may be induced but as there would be six such induction lines the total input current available to the chips 35 would be 6 m A. Given a field energy of say 10 m W. At a conversion efficiency of only 40%, the radiated power would be 4 mW inducing in the Card antenna an oscillation power of, say, 1 mW.

Each laminate has attached to it a thin blank wire 37 and would be in close contact with the conductive deposit of the laminate surface (see enlarged partial view FIG. 22). In the final assembly the tips of these wires would be bonded onto two strip like bonding pads 35a arranged on both sides of the chip 35. The chip fits into a cutout 36 in the laminate sheets 31.

In this configuration, the card could be mass produced at a low cost the 0.1 mm laminates would be topped up by two strong end sheets 0.2 mm thick, and the hole glued together by application of heat and or pressure.

Figure 26:
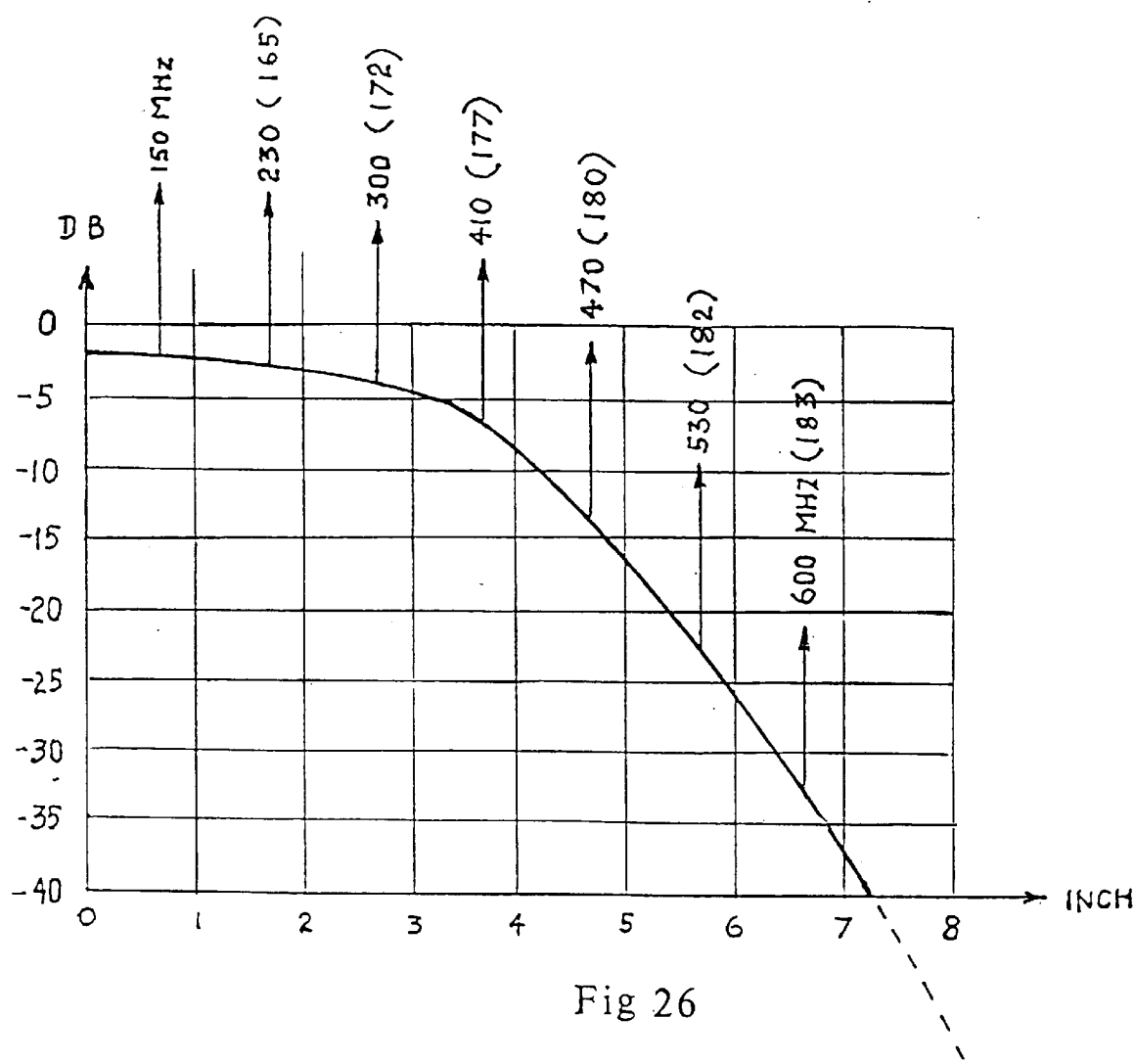

FIG. 26 gives and idea of the frequency changes of the reader card oscillator system at different spacings between the antennas. The figures entered are not derived from measurements. Generally speaking, frequencies would be lowered inverse proportional to the root of the mutual inductance.

Figure 28:
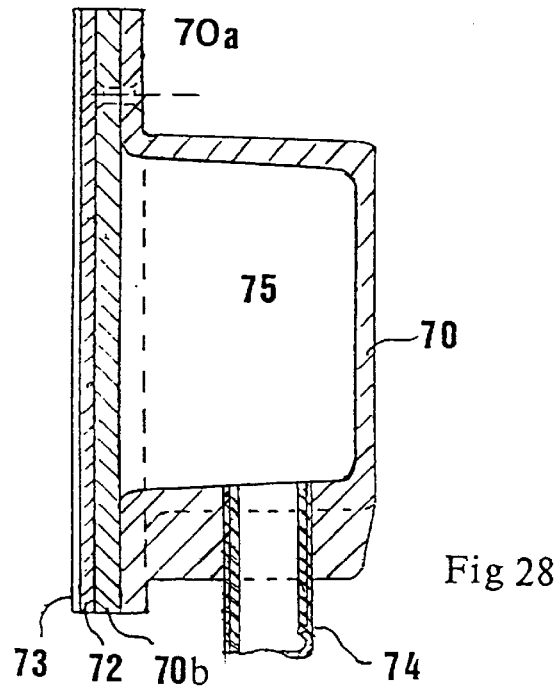
FIG. 28 shows an arrangement of an outdoor terminal which may be either a fixed terminal or alight portable one powered by a battery.

FIG. 28 is a side view in cross section of the integrated component according to the invention. It consists of a shielded space 75 inside a metal shell 70 which contains the VHF circuitry. Also shown are the flange portion 70a, a lid plate 71, a ferrite plate 72 which concentrates the forward directed electromagnetic flux, and finally the laminated sheet/9s/0 73 containing the Reader Antenna of FIG. 24. The metal container 70 nay also contain a compartment for a battery (not shown).

Returning to FIG. 26, it can be seen that a steep decline in flux energy is expected in their transition from antenna spacings beyond 6 inches.

The possibility of utilising very thin laminate internal layers has also potential for using the technique in ordinary paper currency as a means of denoting various data, validity data, denominational value data, etc. They can also store identification of institutions through whose hands the moneys have passed if there is a requirement of an inhibition to misuse and of to help eliminate forged material.

Figure 25:
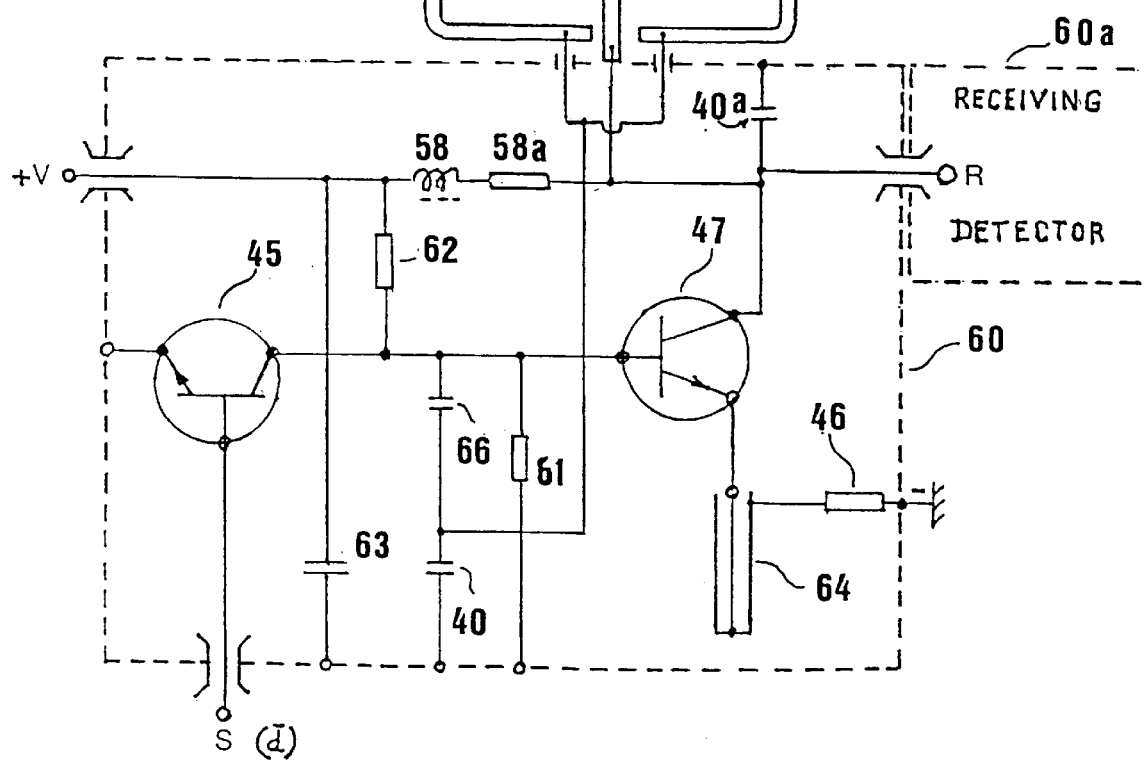
Figure 25:
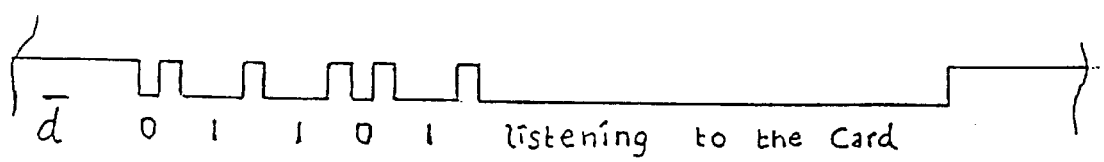

For the purpose of sending digital data, various forms of amplitude modulation may be used and FIG. 25 shows an inverted pulse length modulation for input to the base of transistor 47. When the Reader antenna listens to card data, the input to gate or base of transistor 45 must be kept low. This keeps the transistor 47 in the conductive state with the antenna radiating and sensing the reflected waves which may contain card data.

FIG. 26 gives an idea of the frequency changes of the Reader-Card oscillator system as the spacing between the Reader and card is reduced. The figures entered into the diagram are not derived from measurements. Frequencies will be lowered inverse proportional as the root of the mutual inductance increases.

FIG. 28 is a side view in cross section of the integrated component according to the invention. It consists of a shielded space 75 inside a metal shell 70 which contains the VHF circuitry. Also shown are the flange portion 70a, a lid plate 71, a ferrite plate 72 which concentrates the forward-directed electromagnetic flux, and finally the laminated sheet 73 containing the Reader Antenna of FIG. 24 The metal container 70 may also contain a compartment for a battery (not shown).

Returning to FIG. 26, it can be seen that a steep fall in flux energy is expected in the transition from an antenna spacing beyond 6 inches. This would be partly due date to the antenna configuration as shown, partly due to by the introduction of a negative feedback into the emitter of the transistor 47 (FIG. 24), by means of a coaxial resonator 64 representing the ground connection for the said transistor.

Figure 27:
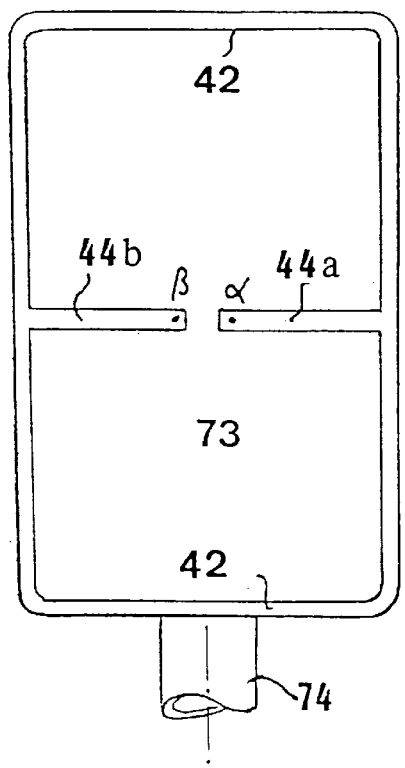
FIG. 27 shows the twin-loop arranged in such a way that the connections alpha and beta come conveniently to be placed in the middle of the Card Terminal.

FIGS. 27 and 28 show the front and side elevations of a card terminal which feasibly may be used for outdoor installations, or as a mobile outdoor unit. In FIG. 27 it will be observed that the antenna layout is modified, mainly to get the endpoints for the twin loops into the centre of the antenna area. (x and β). From these points, metallic connecting pins may reach into the space 15 (FIG. 28) for easy plug connection to the circuitry placed into that space.

Figure 29:
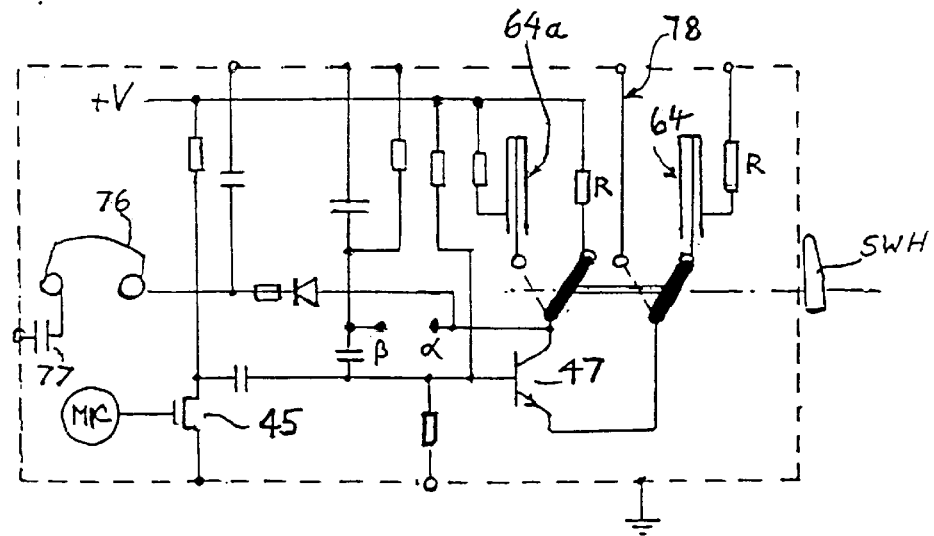
FIG. 29 shows a portable terminal that provides a switch with the option to communicate with a card either at a fixed high frequency, or with a card at a lower, variable, frequency and close range only.

The circuit of FIG. 29 shows the antenna containing points x and β, but is otherwise very similar to that shown in FIG. 24. It is here used also to indicate two further features which may be in demand. One is the addition of the analogue communication facilities producing analogue modulation of the field covered by the twin-antenna geometry. Accordingly, the input to the base of transistor 47 consists of a microphone MIC and the digital data output is replaced by a diode controlled detector circuit and earphone 76.

The second feature is a facility to choose between the already described de-emphasis of the short wave spectrum of resonance possibilities (by means of resonator 64 in the emitter to ground connection) and an emphasis for the shortwave or gigahertz region. A switch handle SWH can externally actuate switches SW1 and SW2 to produce the changeover to a connection where the resonator 64 is replaced by a straight ground connection 78, and the resistor R in the collector of transistor 47 is substituted by another resonator 64a. Similar switches may be provided to produce a changeover from twin-loop to a single loop mode, for temporary range extension.

What I claim is:

1. An embedded antenna module for a non-contact integrated circuit (IC) card, comprising:
   two coils, at least one of which is formed from electrical conductor strip patterns deposited on a first laminate substrate of said card, and said two coils being connected to an IC chip mounted on said card;
   said two coils being driven 180° out of phase with respect to each other in response to an electromagnetic flux produced by a card reader unit, when said IC card is placed in relatively close proximity to the card reader unit;
   wherein said card contains a plurality of laminate substrates, at least two of said plurality of laminate substrates including identical electrical conductor strip patterns deposited thereon.

2. The embedded antenna module of claim 1, wherein said two coils share a common winding.

3. An embedded antenna module for a non-contact IC card reader unit, comprising:
   two coils formed from electrical conductor strip patterns deposited on a first substrate, and said two coils being connected to an IC card data processing electronic circuit through a common feed line;
   wherein said two coils share a common winding, and said IC card data processing circuit is connected to said antenna module at a location on said common winding where an average load resistance of said common winding is matched to an impedance of said antenna module at an operating frequency of said IC card data processing circuit;
   said two coils being driven 180° out of phase with respect to each other by said IC card data processing electronic circuit.

4. A non-contact IC card system, comprising:
   a portable non-contact IC card data carrier having an antenna module tuned to a first resonant frequency and a card reader unit for reading data from said IC card and for writing data to said IC card and having an antenna module tuned to a second resonant frequency;
   said card reader unit producing a carrier wave for contactless communication with said IC card data carrier, said carrier wave having a frequency which produces a maximum bandpass response characteristic in the antenna module of the IC card data carrier when said data carrier and said card reader unit are separated by a predefined optimal distance.

5. A dual loop antenna system comprising two antenna loops and an oscillator drive circuit coupled to said two antenna loops, said system being capable of electromagnetically oscillating in at least two modes, one of said modes wherein said loops oscillate in phase opposition to each other, and the other of said modes in which said loops oscillate in phase unison, by virtue of the configuration of the two antenna loops, the mode of oscillation of said system being determined by the oscillating frequency, which is in turn dependent upon the coupling conditions of the antenna systems.

6. The embedded antenna module of claim 2, wherein said IC chip is connected to said antenna module at a location on said common winding where an average load resistance of said common winding is matched to an impedance of said antenna module at an operating frequency of said IC chip.

7. The embedded antenna module of claim 2, further comprising a common ground plane formed on said laminate substrate, and wherein said two coils have an m shape, with the lower leg portions of said m-shape being widened to form capacitive elements in conjunction with said common ground plane.

8. The non-contact IC card system of claim 4, wherein said antenna modules each have portions which are primarily inductive and portions which are primarily capacitive, whereby bidirectional data transfer between the data carrier and the card reader unit can be carried out utilizing either an electromagnetic field derived from said inductive portions, or an electrostatic field derived from said capacitive portions of said antenna modules.

9. The non-contact IC card system of claim 8, wherein said embedded antenna modules are further adapted to send and receive data signals by electromagnetic radiation, through development of an in-phase resonance in response to homogeneous field changes passing through or alongside said embedded antenna modules.

10. An energy transfer system comprising a non-contact IC data carrier card and a card reader unit, wherein said data carrier card and said card reader unit each include an antenna system according to claim 5.

11. The energy transfer system of claim 10, wherein each of the antenna systems of said data carrier card and said card reader unit comprise two coils formed from electrical conductor strip patterns deposited on a first laminate substrate of said card, and said two coils being connected to an IC chip mounted on said card, said two coils corresponding to the two antenna loops;

the two coils of the card being driven 180° out of phase with respect to each other in response to an electromagnetic flux produced by a card reader unit, when said IC card is placed in relatively close proximity to the card reader unit, and the two coils of the cards being driven in phase unison with each other when said IC card is placed in relatively farther proximity to the card reader unit.

12. The energy transfer system of claim 11, wherein said two coils share a common winding.

13. The energy transfer system of claim 11, wherein said card contains a plurality of laminate substrates with antenna conductors deposited thereon, at least two of said plurality of laminate substrates including identical electrical conductor strip patterns deposited thereon, with other substrates having conductor strip patterns being different to obtain optimal bandpass effects.

* * * * *